United States Patent [19]

Sugisawa et al.

[11] Patent Number: 4,861,559

[45] Date of Patent: * Aug. 29, 1989

[54] CONTINUOUS STERILIZING AND PACKING APPARATUS

[75] Inventors: Ko Sugisawa; Kazuya Sekiguchi; Kiyoaki Tuji; Akinobu Ono, all of Nara, Japan

[73] Assignee: House Food Industrial Company Limited, Osaka, Japan

[*] Notice: The portion of the term of this patent subsequent to Jul. 1, 2003 has been disclaimed.

[21] Appl. No.: 942,376

[22] Filed: Dec. 16, 1986

[30] Foreign Application Priority Data

Dec. 16, 1985 [JP] Japan .................. 60-282350

[51] Int. Cl.$^4$ .............................................. A61L 2/24
[52] U.S. Cl. .................................. 422/110; 422/1; 422/26; 422/106; 422/113; 422/295
[58] Field of Search .............. 422/106, 108, 110, 113, 422/111, 1, 26, 295

[56] References Cited

U.S. PATENT DOCUMENTS

| | | | |
|---|---|---|---|
| 2,019,491 | 8/1927 | Grindrod | 99/454 |
| 4,450,981 | 5/1984 | Haig | 222/61 |
| 4,597,945 | 7/1986 | Sugisawa et al. | 422/113 |

FOREIGN PATENT DOCUMENTS

| | | | |
|---|---|---|---|
| 2137865 | 10/1984 | United Kingdom | 422/113 |
| 2139994 | 11/1984 | United Kingdom | 99/470 |

Primary Examiner—Barry S. Richman
Assistant Examiner—Jill Johnston
Attorney, Agent, or Firm—Oblon, Spivak, McClelland, Maier & Neustadt

[57] ABSTRACT

An apparatus for continuously sterilizes and fills food and medicines containing solids. In this apparatus, a filler nozzle is disposed downstream of a back-pressure tank, and a control valve is interposed between the back-pressure tank and the filler nozzle for controlling the flow rate of the products which are delivered from the sterilizer to the back-pressure tank. The control valve avoids a remarkable pressure loss which might otherwise be invited in the series passages of the apparatus. The outflow of air from the back pressure tank to the filler nozzle is minimized so that the back pressure can be applied to the sterilizer as stably as possible. At the same time, the sterilized products are continuously fed to the filler nozzle so that they can be packed simultaneously with their upstream sterilization.

7 Claims, 6 Drawing Sheets

CONTINUOUS STERILIZING AND PACKING APPARATUS

BACKGROUND OF THE INVENTION

1. Field of the Invention

The present invention relates to an improvement in a sterilizing apparatus for sterilizing materials to be filled, while applying a back pressure to a sterilizer by a back pressure tank having a controllable internal pressure (as is disclosed in (Japanese Patent Laid-Open No. 164062/1984 corresponding to Japanese Patent Application No. 39705/1983), U.S. Pat. No. 4,597,945, British Patent Application No. 8405706 which will be referred to as the "prior art"). The improvement resides in capability of continuously filling a container with the materials which have been sterilized under aseptic condition like the prior art.

Incidentally, the materials to be filled are herein termed a liquid or pastes containing solid particles.

2. Description of the Prior Art

According to the invention of the prior art, the materials are sterilized by the sterilizer under a back pressure or the internal pressure of the back pressure tank, and the materials thus sterilized are sequentially recovered by the back-pressure tank. At the end of the sterilization, moreover, the passage between the sterilizer and the backpressure tank is once shut off by a valve, and the sterilized materials are delivered for batch-filling to a vacant filler means. This means that the sterilization and filling of the materials are preformed separately so that what is provided by the prior art is a batch-processing technique and lacks simultaneousness and continuity.

OBJECT OF THE INVENTION

The present invention contemplates to solve the above-specified problem of the prior art and has an object to provide an apparatus for continuously and simultaneously sterilizing and filling materials.

SUMMARY OF THE INVENTION

The gist of the present invention resides in the combination of control means and a filler means with the sterilizing apparatus of the prior art having the sterilizer and the back-pressure tank. In the continuous sterilizing and filling apparatus of the present invention, more specifically, the filler means is disposed downstream of the back-pressure tank, and the control means is interposed between the backpressure tank and the filler means for controlling the flow rate of the materials, which are delivered from the former to the latter, to a value equal to or lower than the flow rate of the materials which are delivered from the sterilizer to the backpressure tank.

The control means avoids a remarkable pressure loss which might otherwise be invited in the series passages of the apparatus. Moreover, the outflow of air from the back pressure tank to the filler means is minimized so that the back pressure can be applied to the sterilizer as stably as possible. At the same time, the sterilized material is continuously fed to the filler means so that it can be filled with its upstream sterilization.

According to one aspect of the present invention, there is provided an apparatus for continuously sterilizing and filling materials, comprising: (a) a feeding device for feeding materials; (b) a sterilizer disposed downstream of said feeding device for sterilizing the fed materials; (c) a back-pressure tank disposed downstream of said sterilizer and having a controllable internal pressure for applying a controlled back pressure to said sterilizer; (d) a filler means disposed downstream of said back-pressure tank for successively filling said sterilized liquid in containers; and (e) control means for controlling the flow rate of said sterilized materials, which are delivered from said backpressure tank to said filler means, to a value not higher than the flow rate of said sterilized materials which are fed from said sterilizer to said back-pressure tank.

BRIEF DESCRIPTION OF THE DRAWINGS

Other objects, features and advantages of the present invention will become apparent from the following description to be made with reference to the accompanying drawings, in which.

DESCRIPTION OF THE PREFERRED EMBODIMENTS

The present invention will be described in detail in the following in connection with the embodiments thereof.

Figure 1A:
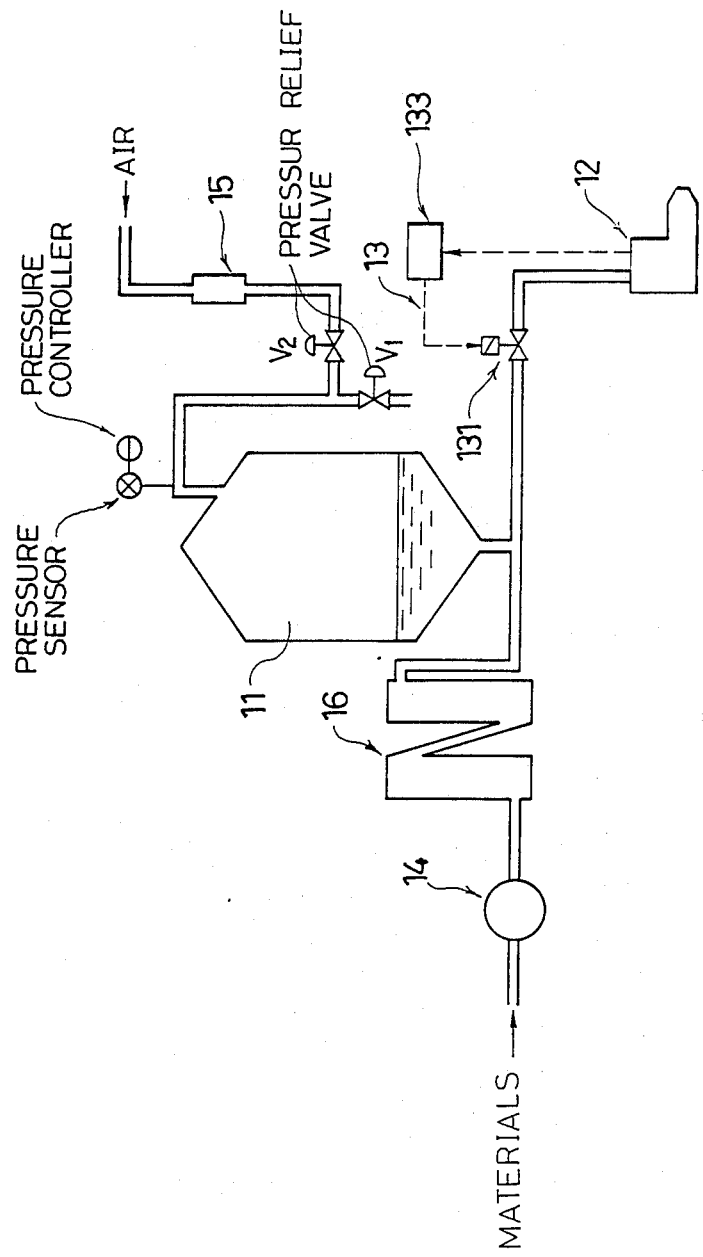
FIG. 1A is a schematic diagram showing an apparatus for continuously sterilizing and filling materials according to one embodiment of the present invention, in which a valve is used as the control means.
Figure 1B:
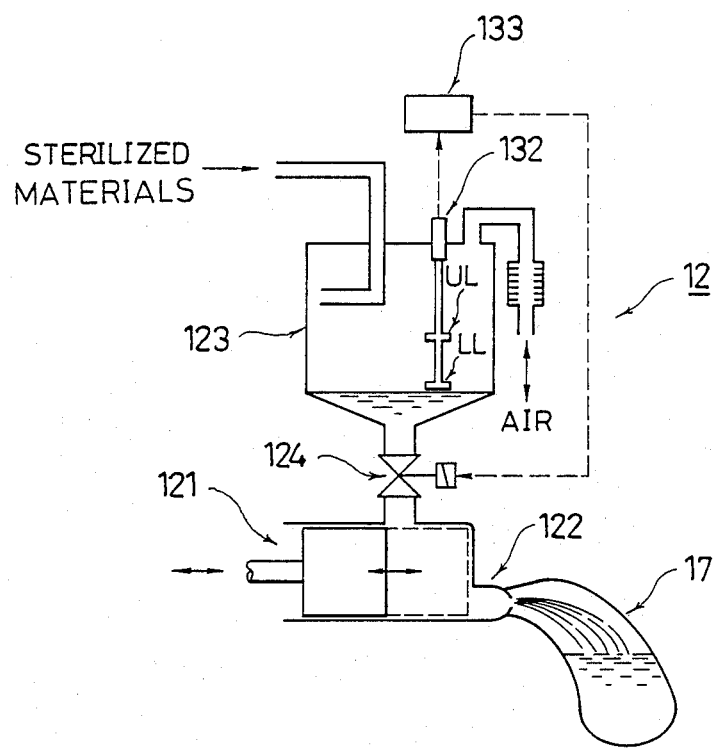
FIG. 1B is an enlarged schematic diagram showing the filler means of FIG. 1A.

In the apparatus for continuously sterilizing and filling materials as denoted generally at 10 in FIG. 1A, there is disposed downstream of a back-pressure tank 11 and upstream of a filler means 12 control means 13 which includes a (sterile) valve 131. This valve 131 may be exemplified by a diaphragm valve or a ball valve, which has a function to allow the solids to pass therethrough in addition to the flow control function. Turning to FIG. 1B, the filler means 12 includes a filling piston 121, a filling nozzle 122, and a filling reservoir 123 disposed upstream of the filler means proper 121 and 122. This reservoir 123 is equipped with a level sensor 132 which forms part of the control means 13. This control means 13 further includes a control unit 133 which is connected between the level sensor 132 and the aforementioned valve 131.

The materials in the form of liquid are fed by a feeding device means 14 to the back-pressure tank 11 which is vented to the atmosphere through a pressure relief valve $V_1$ and a compressed air tank (not-shown) through a pressure relief valve $V_2$ and a sterilizing filter 15, by way of a sterilizer 16. As a result, the materials are sterilized by the sterilizer 16 under the back pressure controlled by the back pressure tank 11. The materials thus sterilized are delivered through the back-pressure tank 11 toward the filler means 12. As better seen from FIG. 1B, the delivered materials are once reserved in the filling reservoir 123 and are then filled in a container such as a bag 17 by the coactions of the filling piston 121 and the filling nozzle 122.

Figure 2:
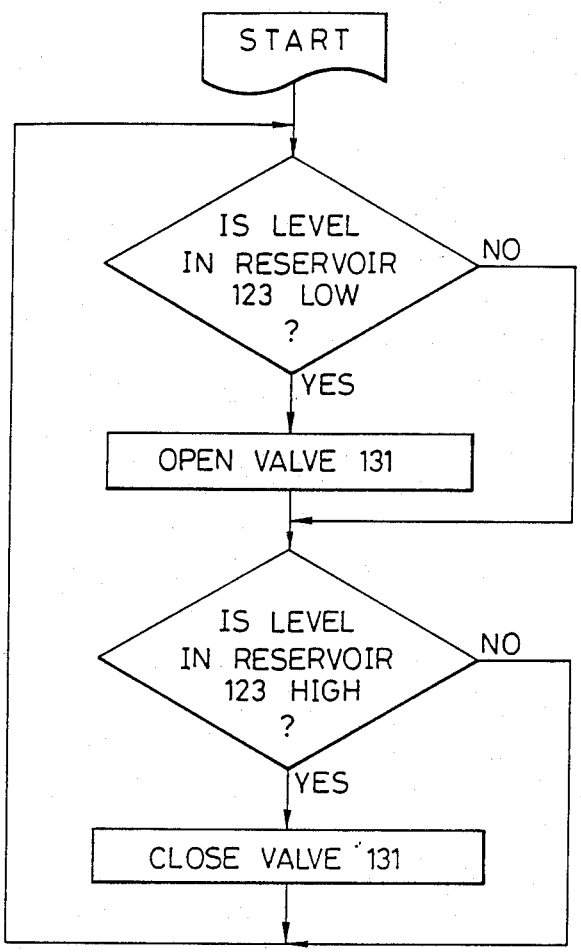
FIG. 2 is a flow chart showing the control operations of the valve by the control means in response to the materials level in a reservoir of the filler means.

The apparatus 10 of the present invention continues its sterilizing and filling operations in the manners described above. If, during this run, the filling rate (or capacity) of the filling piston 121 and the filling nozzle 122 fails to match the flow rate of the materials fed to them, this materials will gradually accumulate in the filling reservoir 123. Then, in order to prevent an excessive accumulation, the control means 13 causes its valve 131 and level sensor 132 to act under an electrical control, as will be described in the following with additional reference to the flow chart of FIG. 2.

When the run of the apparatus 10 advances so that the level of the materials in the filling reservoir 123 drops to a predetermined lower limit LL, as indicated in FIG. 1B, the level sensor 132 detects this lower limit LL so that the control unit 133 produces an "OFF" signal to leave the valve 131 open. When, on the contrary, the materials accumulate in the filling reservoir 123 so that its level reaches a predetermined upper limit UL, as indicated in FIG. 1B, the level sensor 132 detects this upper limit UL so that the control unit 133 produces an "ON" signal to close the valve 131.

It should be noted here that the control of the control means 13 is accomplished such that the flow rate of the materials delivered from the back-pressure tank 11 to the filler means 12 is made slightly lower than the flow rate of the materials fed from the sterilizer 16 to the back pressure tank 11 by the control means 13.

So long as the apparatus 10 runs, as described above, its pressure neither loses, nor there is any outflow of air from the back-pressure tank 11 to the filler means 12. As a result the internal pressure of the back pressure tank 11 is controlled to a remarkably stable level so that the sterilizer 16 can operate under a sufficiently stable back pressure. Simultaneously with this, the sterilized materials are continuously fed from the filling reservoir 123 to the filling piston 121 and nozzle 122 so that its filling operation can be successively conducted.

Incidentally, while the apparatus 10 of the present invention is running, as described above, the materials may gradually accumulate in the back-pressure tank 11. Inspite of this gradual accumulation, however, the run of the apparatus 10 can be continued for a predetermined period if the capacity of the back pressure tank 11 is determined at an appropriate value.

Thus, the flow rate of the sterilized materials can be controlled to a desired value by the ON/OFF control of the valve 131, which is affected by the control unit 133 connected between the valve 131 and the level sensor 132. This control is effective especially in case the materials contain solids, because the ON/OFF control does not establish any narrow gap at the valve 131.

In an alternative, a valve 124 may be interposed between the filling reservoir 123 and the filler means proper 121 and 122. That valve 124 can also be controlled by the control unit 133 which responds to a (not-shown) sensor for shooting the trouble, if any, of the filler means proper 121 and 122. In case this trouble is shot by the sensor, the control unit 133 produces a signal to close the valve 124 so that the materials can be temporarily reserved in the reservoir 123 to allow its sterilization to continue.

In another alternative, the control means 13 may further include a (not-shown) sensor for detecting the level of the materials in the back-pressure tank 11 to produce a signal when the materials level drops to a predetermined low level. In response to this signal, the control unit 133 can close the valve 131.

Figure 3:
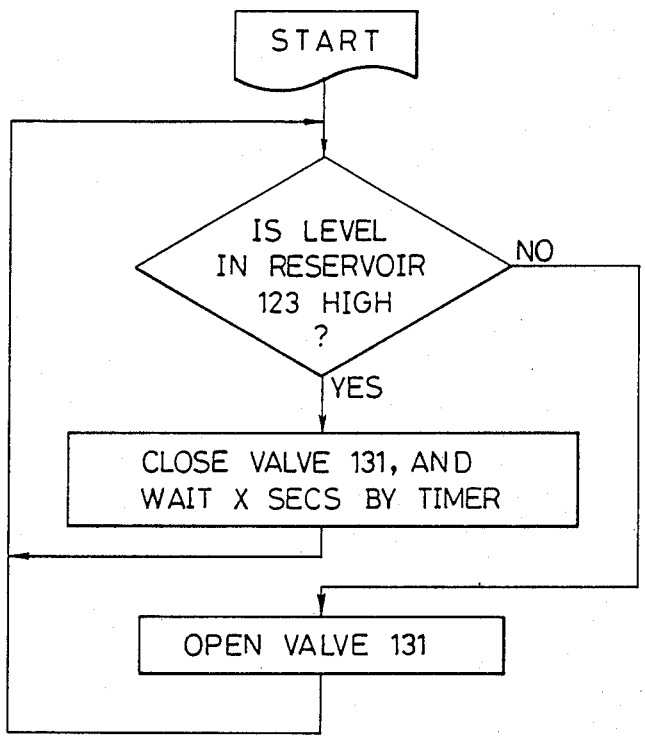
FIG. 3 is a flow chart showing other control operations of the valve.

The control thus far described can be modified into an electrical control, as shown in the flow chart of FIG. 3.

When the materials to be filled accumulate in the filling reservoir 123 to arrive at the predetermined upper level UL, this arrival is detected by the level sensor 132. In response to this, the control unit 133 produces the signal to close the valve 131. It should be noted here that the control unit 133 may have a (not-shown) timer for continuing the signal production for X secs. As a result, the closure of the valve 131 is continued for X secs. Thus, the flow rate of the materials fed to the filling reservoir 123 (i.e., the materials to be delivered from the back-pressure tank 11 to the filler means 12) are controlled.

In this modification, the period of X secs, for which the closure of the valve 131 is continued by the timer, is so determined as to satisfy the matching condition between the flow rate of the materials to be delivered from the back-pressure tank 11 to the filler means 12 and the filling capacity of the filler means proper 121 and 122.

Figure 4:
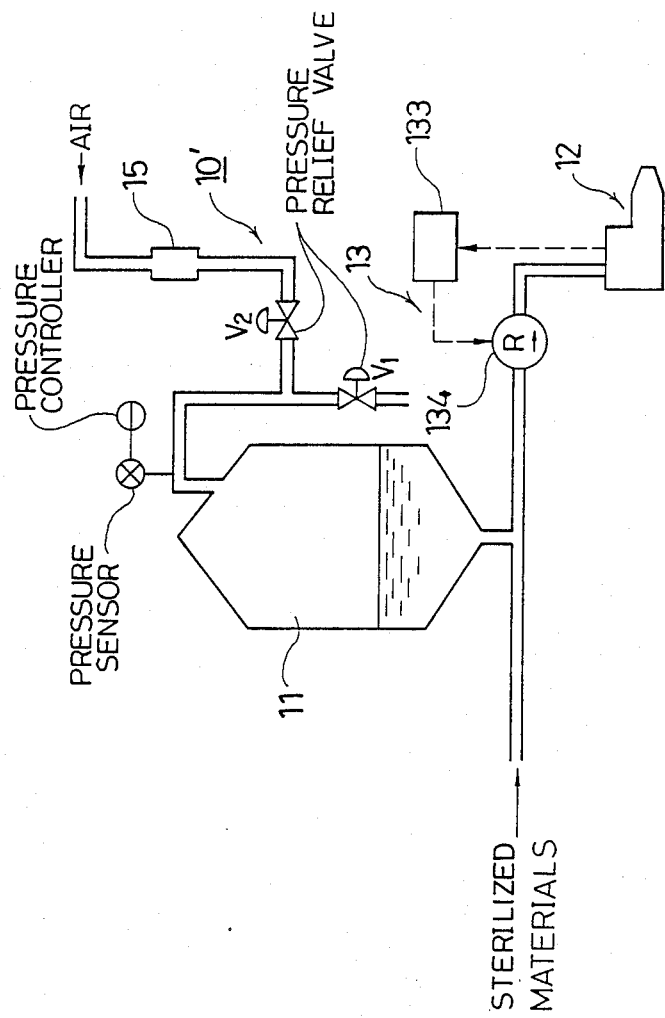
FIG. 4 is a schematic diagram showing an apparatus according to another embodiment of the present invention, in which the valve of FIG. 1A is replaced by a feeding device.

Turning now to FIG. 4, the valve 131 of FIG. 1A is replaced by a feeding device such as a rotary feeding device 134 which will not deteriorate the sterility of the apparatus 10'. The construction and operation of this modified apparatus 10' are similar to those of the apparatus 10 of FIGS. 1A and 1B except the action of the rotary feeding device 134 and will therefore be omitted here.

The flow rate of the sterilized materials to be fed from the back-pressure tank 11 to the filler means 12 can be controlled by another method, as will be described in the following with reference to FIG. 5.

Figure 5:
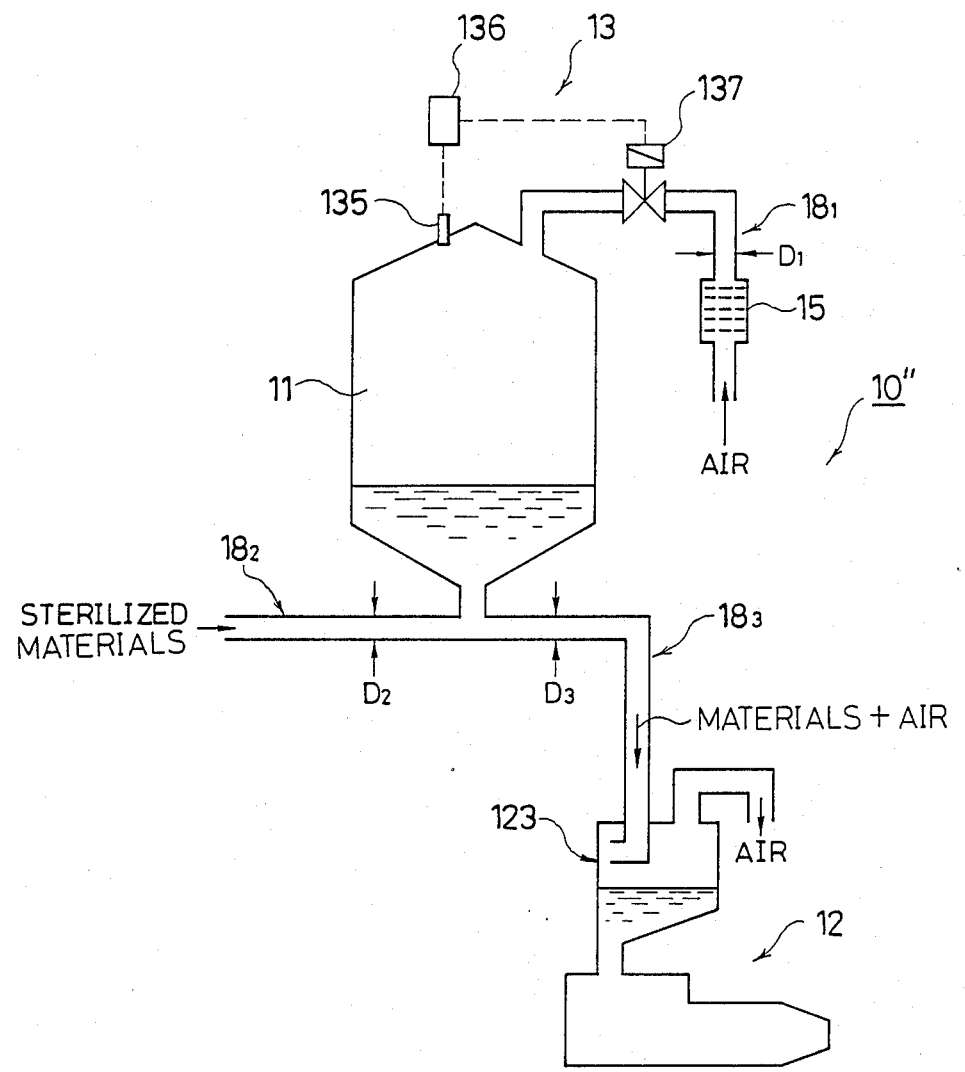
FIG. 5 is a schematic diagram showing an apparatus according to still another embodiment of the present invention, in which the control means is embodied by pipes having adjusted diameters and a pressure sensor for sensing the internal pressure of the back-pressure tank.

In FIG. 5: the pipe leading to the back-pressure tank 11 for supplying the sterilized air is denoted at $18_1$, the upstream pipe leading from the sterilizer (although not shown) to the back pressure tank 11 for feeding the sterilized materials is denoted at $18_2$; and the downstream pipe leading from the back pressure tank 11 to the filler means 12 for feeding the materials to be packed is denoted at $18_3$. The air supply pipe 181 is vented to a compressed air tank (not-shown) through the control valve 137 and the sterilizing filter 15, as has been described with reference to FIG. 1A. It should be noted here that the diameter $D_1$ of the air supply pipe $18_1$ is made larger than the diameter $D_3$ of the downstream pipe $18_3$, and that the diameter $D_2$ of the upstream pipe $18_2$ is made equal to or slightly larger than the diameter $D_3$ of the downstream pipe $18_3$. In addition, the control means 13 in this embodiment includes a pressure sensor 135 which is attached to the back-pressure tank 11 for detecting the internal pressure of the same. Further included is a control unit 136 through which the pressure sensor 135 is connected to the control valve 137 disposed in the air supply pipe $18_1$. This control valve 137 controls the flow rate of the sterilized air to be supplied through the pipe $18_1$ to the back-pressure tank 11.

According to this embodiment, the internal pressure in the tank 11 can be controlled to such an appropriate level as can apply a sufficient back pressure to the sterilizer (although not shown) while compensating the pressure to be lost in the downstream pipe $18_3$. Since, moreover, the air supply pipe $18_1$, the upstream pipe $18_2$ and the downstream pipe $18_3$ are set to have the above-specified diameter relationships, i.e., $D_1 > D_3$ and $D_2 \geqq D_3$, the outflow rate of the air to the downstream pipe $18_3$ will not exceed the supply rate of the air to the back-pressure tank 11. This will avoid the pressure loss in the apparatus 10''. At the same time, the flow rate of the materials delivered from the back pressure tank 11 to the filler means 12 is controlled to a value equal to the flow rate of the materials fed from the (not-shown) sterilizer to the back pressure tank 11 so that the sterilized materials to be filled can be continuously fed to and filled by the filler means 12.

Incidentally, the control of the internal pressure of the back-pressure tank 11 is accomplished by the coactions of the pressure sensor 135, the control unit 136 and the control valve 137. Specifically, when the internal pressure detected by the pressure sensor 135 is low, the control unit 136 responds to the sensor 135 to produce a signal to open the control valve 137. With this valve 137 being opened, the sterilized air is introduced through the open valve 137 into the back-pressure tank 11 via the air supply pipe $18_1$ so that the internal pressure of the back pressure tank 11 may restore a predetermined level.

What is claimed is:

1. An apparatus for continuously sterilizing and filling materials containing solids therein, said apparatus comprising:
   (a) a feeding device for feeding materials;
   (b) a sterilizer in fluid communication with an outlet of said feeding device for sterilizing the materials.
   (c) a back-pressure tank in direct fluid communication with an outlet of said sterilizer, said back-pressure tank having a controllable internal pressure for applying a controlled back pressure to said sterilizer;
   (d) filler means positioned in fluid communication with said back-pressured tank for successively filling sterilized materials in containers; and
   (e) control means disposed between said backpressure pressured tank and said filler means for controlling the flow rate of the materials, which are delivered from said back-pressure tank to said filler means, to a value not higher than the flow rate of the materials which are fed from said sterilizer to said back-pressure tank.

2. An apparatus according to claim 1, wherein said control means includes:
   (a) a level sensor disposed in a reservoir of said filler means for detecting the level of the materials in the reservoir of said filler means;
   (b) flow means interposed between said backpressure tank and said filler means for causing the materials, when controlled, to flow from said back-pressure tank to said filler means; and
   (c) a control unit for responding to said level sensor for controlling said flow means.

3. An apparatus according to claim 2, wherein said flow means has a valve for opening and closing the passage between said back-pressure tank and said filler means in an ON/OFF manner.

4. An apparatus according to claim 2, wherein said flow means has a feeding device for feeding the materials from said back-pressure tank to said filler means.

5. An apparatus according to claim 2, wherein said level sensor detects the upper and lower limits of the liquid level of said filler means.

6. An apparatus according to claim 2, wherein said control means further includes a normally open valve interposed between the reservoir and a filler means proper of said filler means for closing the passage in between to temporarily reserve the materials in said reservoir.

7. An apparatus according to claim 1, wherein said control means includes:
   (a) a pressure tank for detecting an internal pressure of and back-pressure tank;
   (b) a control valve interposed between said back-pressure tank and a compressed air tank for controlling a flow rate of compressed air to be supplied to said back-pressure tank, when controlled; and
   (c) a pressure controller for responding to said pressure sensor to control said control valve, and
   (d) wherein an air supply passage leading to said back-pressure tank, a passage leading from said sterilizer to said back-pressure tank, and a passage leading from said back-pressure tank to said filler means have their respective diameters $D_l$, $D_2$, and $D_3$ defined by the following inequalities:

$D_1 > D_3$; and $D_2 \geqq D_3$.

* * * * *